US007580155B2

(12) United States Patent
McElvain

(10) Patent No.: US 7,580,155 B2
(45) Date of Patent: Aug. 25, 2009

(54) TOOLS TO EMBED INFORMATION INTO DIGITAL VISUAL WORKS

(75) Inventor: Jon McElvain, Manhattan Beach, CA (US)

(73) Assignee: Xerox Corporation, Norwalk, CT (US)

( * ) Notice: Subject to any disclaimer, the term of this patent is extended or adjusted under 35 U.S.C. 154(b) by 633 days.

(21) Appl. No.: 11/311,945

(22) Filed: Dec. 19, 2005

(65) Prior Publication Data

US 2007/0139714 A1 Jun. 21, 2007

(51) Int. Cl.
*H04N 1/405* (2006.01)
(52) U.S. Cl. ..................... 358/3.06; 358/3.28
(58) Field of Classification Search ............ 358/3.06, 358/3.28, 450, 534, 540; 380/277
See application file for complete search history.

(56) References Cited

U.S. PATENT DOCUMENTS

| 2002/0102007 | A1 | 8/2002 | Wang |
| 2003/0156753 | A1 | 8/2003 | Fan et al. |
| 2003/0223099 | A1 | 12/2003 | Fan et al. |
| 2003/0231349 | A1 | 12/2003 | Wang et al. |
| 2004/0101158 | A1* | 5/2004 | Butler .................. 382/100 |
| 2004/0258272 | A1* | 12/2004 | Fan ...................... 382/100 |
| 2005/0123194 | A1 | 6/2005 | Fan et al. |
| 2005/0237546 | A1 | 10/2005 | Rahman et al. |
| 2006/0072159 | A1* | 4/2006 | Eschbach et al. ......... 358/3.06 |

OTHER PUBLICATIONS

Anderson, B., High Tech Printing Makes IDs More Secure, securitymagazine.com, Jun. 1, 2004, BNP Media.
Your Guide to: Document Security, Appleton Papers, Wisconsin, United States, Dec. 2005.

* cited by examiner

*Primary Examiner*—Thomas D Lee
(74) *Attorney, Agent, or Firm*—Niele Law Group PC

(57) ABSTRACT

Apparatus are provided, including a digital two-dimensional authentic image, an image processor, authentication message data, and a screen to be applied to at least a portion of the two-dimensional image. The authentication message data represent an authentication message, which may be a textual message, a symbol, or a pattern, and which may signify that the authentic image is authentic or original. The screen may apply two different halftoning operations. The two different halftoning operations include a first halftoning operation applying halftoning elements arranged in one way and a second halftoning operation applying halftoning elements arranged in second way. The first halftoning operation is applied in a limited area of the authentic image and in a form defined by the authentication message data, and the second halftoning operation is applied in an area surrounding the limited area.

17 Claims, 4 Drawing Sheets

TOOLS TO EMBED INFORMATION INTO DIGITAL VISUAL WORKS

NOTICE OF COPYRIGHT

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

FIELD OF THE DISCLOSURE

Aspects of the present disclosure relate to embedding information in printed works. Other aspects relate to authenticating printed documents.

BACKGROUND

Various known techniques exist for embedding information into a printed work, for example, a legal document or currency. The embedded information may be visual information, which can be embedded into the document by treating the document. For example, micro printing produces an image that is too small to be discerned by the naked eye. The size, for example, of the image may be one hundredth of a normal type size. While features of this size can be easily printed, they are difficult to copy or scan. The printed feature is thus covert, and may be viewed using a magnifying glass to confirm the fact that the printed item is an original.

Another technique that is used to authenticate documents is called the void pantograph. Printed dots of different sizes are utilized to create an effect. Smaller dots visible to the human eye dominate the appearance of the form. However, these smaller dots are lost when a facsimile is produced in copying or scanning. Then, larger, less frequently printed dots become visible in the copy, and spell out the word "void."

Watermarking techniques can be used which involve printing a fixed pattern on some portion of the document, such that the pattern is easily detectable by the human eye. A document, for example, a check, may be authenticated by simply viewing this watermark. The type of watermark chosen is typically difficult to replicate with electronic scanning or printing methods. For example, the watermark may be a complex watermark pattern that would interfere with the scanner or printer device, or the watermark may include specialty inks that are outside the gamut of a typical scanner or printer device.

SUMMARY

Apparatus are provided, which include a digital two-dimensional authentic image and an image processor. Authentication message data is provided which represents an authentication message. A screen is provided to be applied to at least a portion of the two-dimensional image. The screen applies two different halftoning operations. A first halftoning operation applies halftoning elements arranged in one way, and a second halftoning operation applies halftoning elements arranged in a second way. The first halftoning operation is applied in a limited area of the authentic image, in a form defined by the authentication message data. The second halftoning operation is applied in an area surrounding the limited area. The authentication message data may include a textual message, a symbol, or a pattern.

BRIEF SUMMARY OF THE DRAWINGS

Embodiments of the disclosure are further described in the detailed description, which follows, by reference to the noted drawings, in which like reference numerals represents similar parts throughout the several views of the drawings, and wherein.

DETAILED DESCRIPTION

In embodiments herein, a given two-dimensional image may, for example, may be defined by a pattern (for example, an array) of pixels. Each pixel may correspond to a defined location in the image (for example, a grid cell), and includes tone information. In the embodiments herein, for a given point (for example, corresponding to a pixel or a region of an image), tone information generally includes a color component (related to one or more frequencies of visible light) and an intensity component (related to a radiant intensity of a pixel).

In a color image, by way of example, a given pixel may have tone information defined in terms of several color values—C for cyan, M for magenta, Y for yellow, and K for black. In simplified terms, the magnitude of each of these values may represent the intensity of the individual color at the pixel's location. In embodiments herein, each color component of an image may be referred to as a layer or a separation of the image. The color image is a composite of the complete set of separations.

A printed item, in embodiments herein, may refer to any item that has information printed thereon. An authenticated or original printed item, in embodiments herein, may refer to a printed item that has not been copied without authorization and/or carries certain information that only an original or authenticated item will have. In embodiments herein, an authenticated or original printed item may refer to such an item that either contains positive indicia that it is authentic or original, or lacks an indication that it is void, inauthentic or not original. In addition, or in the alternative, a printed item that is neither authentic nor original may lack a certain appearance or quality when viewed by the naked eye, or when viewed using some other mechanism.

Figure 1:
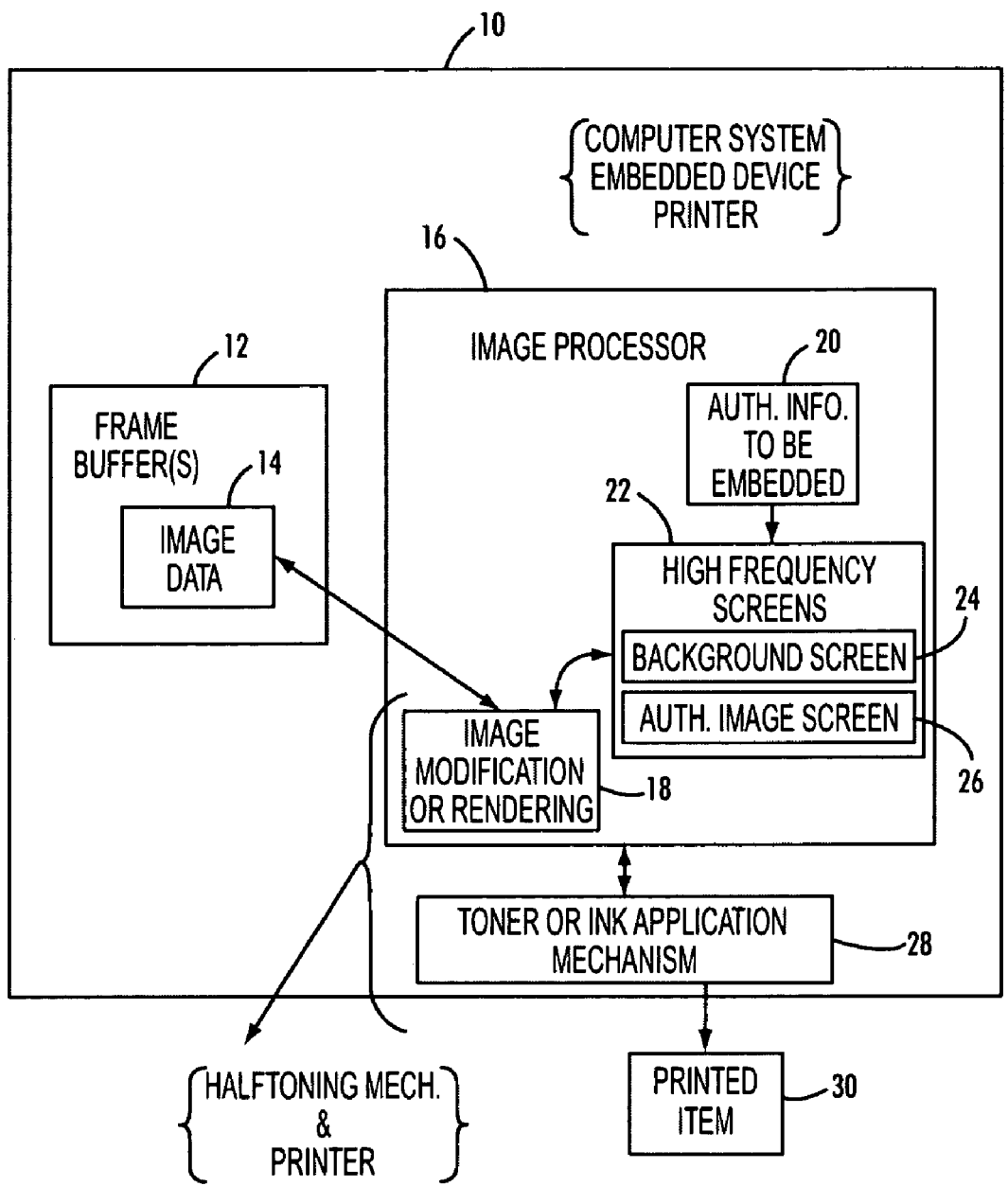
FIG. 1 is a block diagram of a system with an image processor.

FIG. 1 is a block diagram of a system with an image processor. The illustrated system 10 includes one or more frame buffers 12, an image processor 16, and a toner or ink application mechanism 28. The illustrated one or more frame buffers 12 include, among other elements not specifically shown, image data 14. The illustrated processor 16 includes an image modification or rendering mechanism 18, authentication information 20 to be embedded within an image to be printed on the printed item, and high frequency screens 22.

The illustrated image modification or rendering mechanism 18 may do one or both of modifying and rendering image data 14 stored in frame buffer(s) 12. For example, mechanism 18 may modify the image data 14 by replacing frames in frame buffer(s) 12 with pixel information representing an image document using a particular format. Mechanism 18, when rendering the image data, may perform operations on the image data to put it in a condition suitable for rendering. For example, the illustrated image modification or rendering mechanism 18 may comprise a halftoning mechanism for halftoning the image data to make it suitable for printing or for otherwise applying the image to a printed item. For example, certain printers require unique halftoning operations to be performed on the image data in order for those printers to apply various layers of ink to the printed item. In accordance with any halftoning that may be performed, toner or ink application mechanism 28 will apply toner or ink to the printed item, thereby placing the image on the printed item.

In the illustrated embodiment, the image data 14 includes a digital two-dimensional authentic image, to be rendered on a printed item 30. The illustrated image processor 16 processes the image, making it suitable for printing on printed item 30. As the image is printed on the printed item 30, authentication information 20 is embedded within the image in the printed item 30. The authentication information 20 may include a textual message, a symbol, or a pattern, and may represent an authentication message, e.g., that the resulting printed item (e.g., a printed document) is authentic or original.

The high frequency screens 22 are applied to at least a portion of the two-dimensional image represented within image data 14, as it is modified or rendered by image modification or rendering mechanism 18.

In the illustrated embodiment, the one or more high frequency screens 22 apply two different halftoning operations, including a first halftoning operation applying halftoning elements arranged in one way and a second halftoning operation applying halftoning elements in second way. The first halftoning operation is carried out by authentication image screen 26 in the system shown in FIG. 1, which performs a first halftoning operation on the limited area of the authentic image in a form defined by the authentication message data. The second halftoning operation is carried out by background screen 24, and is applied in an area surrounding the limited area. In the illustrated embodiment, the background screen 24 is applied to the entire remaining portion of the authentic image.

In one embodiment, the image modification or rendering mechanism 18 and the toning or ink application mechanism 28 collectively include a halftoning mechanism and a printer, which together form the image on printed item 30.

Figure 2:
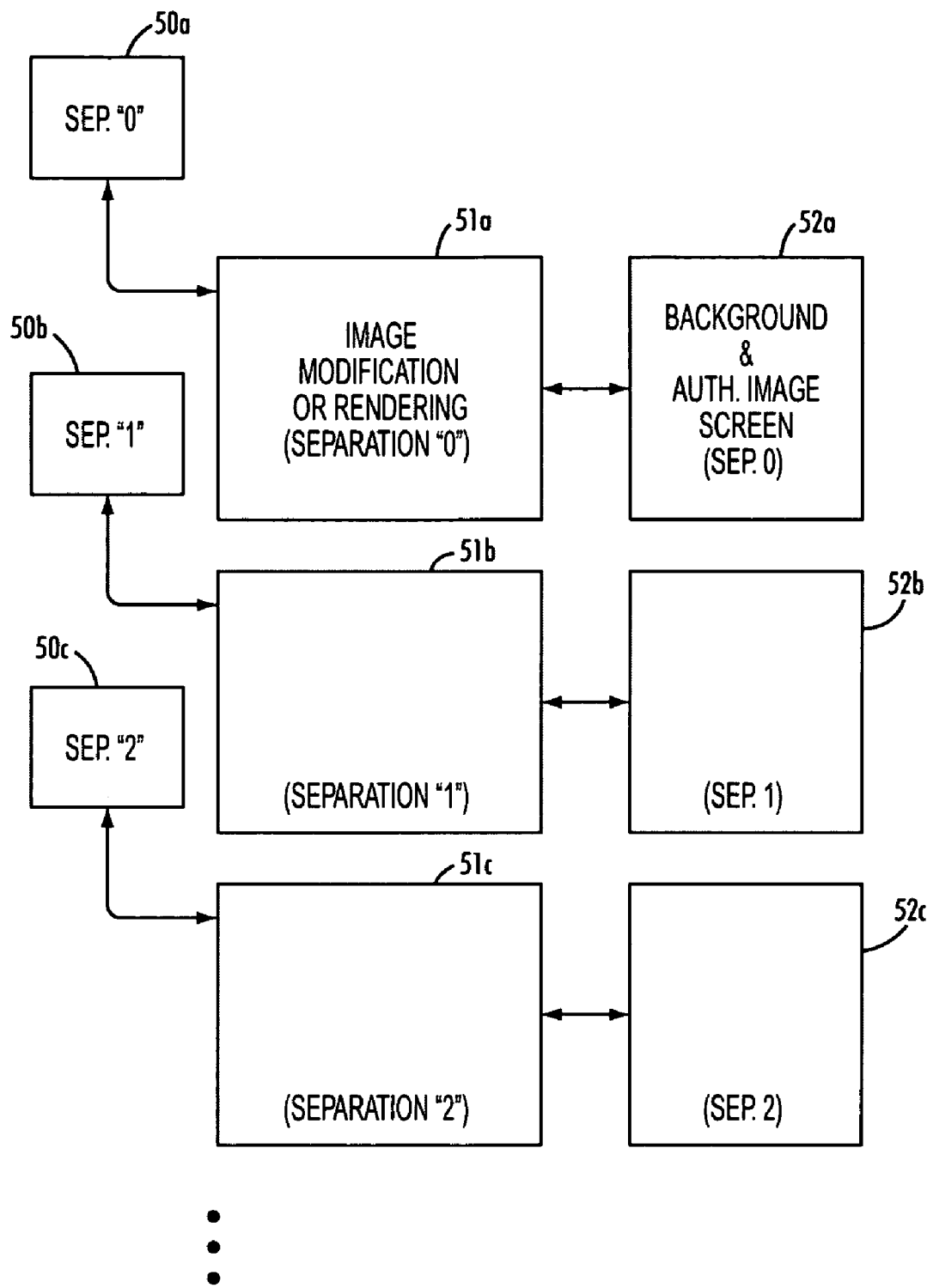
FIG. 2 is a block diagram schematically showing a multiple channel authentication embedding subsystem.

FIG. 2 is a block diagram of a multiple channel authentication embedding subsystem. Separate image modification or rendering mechanisms 51 and screens 52 are provided for each separation forming the composite image on printed item 30. For example, an authentication image may be formed within multiple separations. Those separations, in the example, may include, for example, magenta, cyan, yellow, and black separations. Accordingly, a separation "0" 50a is modified or rendered by image modification or rendering mechanism 51a, which includes the application of background and authentication image screens 52a for that separation. Separations "1" 50b and "2" 50c are separately processed by image modification or rendering mechanisms 51b and 51c, respectively, in accordance with their respective background and authentication image screens 52b and 52c.

Figure 3:
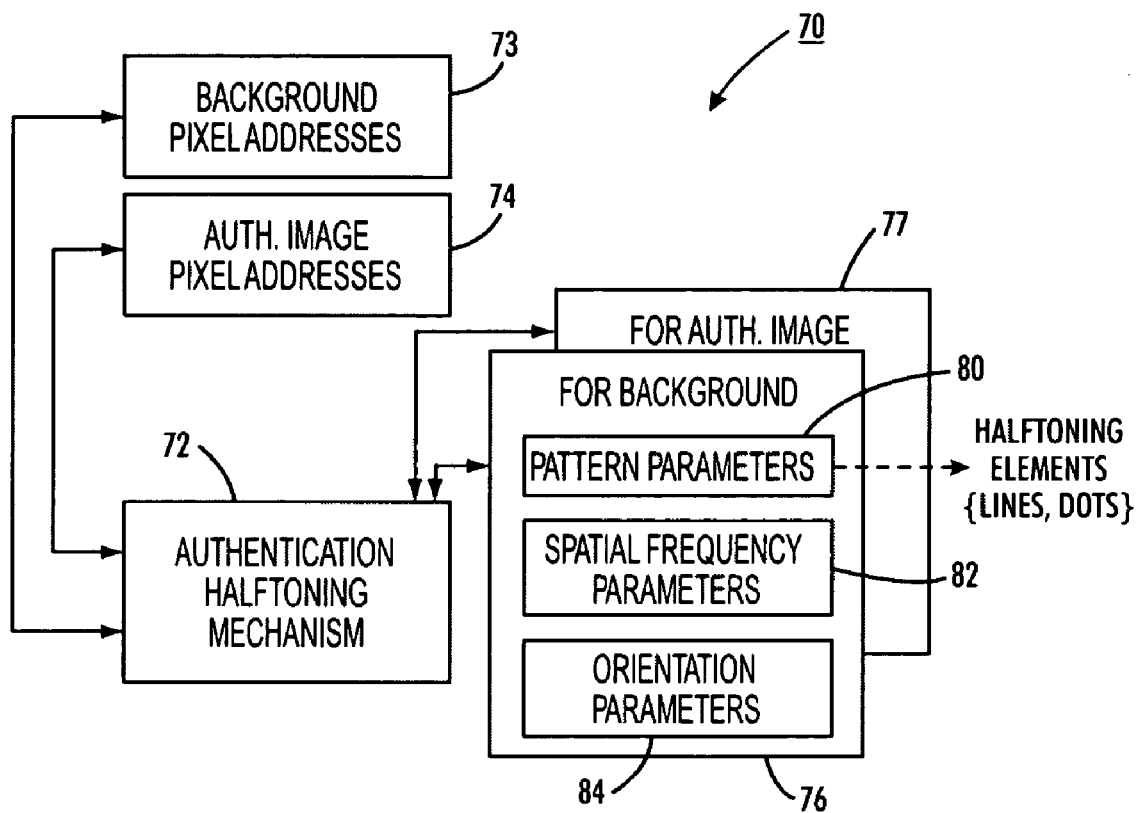
FIG. 3 is a block diagram of an authentication halftoning subsystem.

FIG. 3 illustrates, in a block diagram, an embodiment of an authentication halftoning subsystem 70. System 10 of FIG. 1 may include a halftoning subsystem as shown in FIG. 3, e.g., as part of its halftoning engine. The illustrated subsystem 70 includes an authentication halftoning mechanism 72, which performs authentication halftoning on portions of the image to cause embedding of authentication image information into the image portrayed on the printed item 30. The authentication halftoning mechanism 72 may be provided as part of or separate from a halftoning engine of the image processor 16 of system 10. Authentication halftoning mechanism 72 applies a certain halftoning operation on a limited area corresponding to authentication image pixel addresses 74, and applies another halftoning operation on a background pixel area surrounding the limited area, the background pixel area corresponding to background pixel addresses 73. These halftoning operations may be performed by a background halftoning engine 76 and an authentication image halftoning engine 77. Each of those engines may include mechanisms for controlling pattern parameters 80, spatial frequency parameters 82, and/or orientation parameters 84 each affecting the halftoning elements used to modulate the image, to distinguish the authentication image portion from the background image portion.

The illustrated authentication image halftoning engine 77 performs a first halftoning operation applying halftoning elements arranged in one way, and the illustrated background halftoning engine 76 performs a second halftoning operation applying halftoning elements arranged in a different way. In the embodiment illustrated in FIG. 3, that halftoning may involve a specific pattern, for example, lines or dots, arranged to give a visual effect to the resulting image. Specifically, for the authentication image pixel addresses 74 forming the authentication image, halftoning elements may be applied to the image in one way, while for background pixel addresses 73 (surrounding the authentication image pixel addresses 74), halftoning elements may be applied in a different way.

For example, in the illustrated embodiment, the halftoning elements are parallel lines, arranged at one angle for the authentication image pixels and at a different angle for the background pixels surrounding the authentication image pixels.

Pattern parameters 80 may be provided to specify the type of halftoning element and other parameters concerning those halftoning elements. For example, a set of pattern parameters may include the dimensions and shape of each halftoning element. In addition, pattern parameters 80 can indicate whether the halftoning elements are, for example, lines or dots. The spatial frequency of the halftoning elements may be specified by spatial frequency parameters 82, so that the spatial frequency of the elements for the authentication image pixel addresses 74 is different than the spatial frequency of the elements for the background pixel addresses 73. In addition, orientation parameters 84 may be provided to specify the orientation (e.g., the angle) of the halftoning elements for the background pixel addresses 73 which may be different than the orientation for the authentication image pixel addresses 74.

As noted above, the halftoning operation applied to the authentication image pixel addresses 74 may include parallel lines arranged at a first angle in relation to a horizontal direction within the image. The second halftoning operation applied to the background pixel addresses 73 may include parallel lines arranged at a second angle in relation to the horizontal direction in the image that is different from the first angle. The difference between these angles for example, may be at least 15 degrees. The angle of the parallel lines applied in the first halftoning operation may be 45 degrees (measured in a counterclockwise direction) in relation to horizontal, while the angle of the parallel lines applied in the second halftoning operation may be 60 degrees (measured in the same direction) in relation to horizontal.

Alternatively, to create a contrast in the second halftoning operation in relation to the first halftoning operation, the first and second halftoning operations may apply a geometric shape or plural shapes alternating in a spatial frequency that is different for the first halftoning operation than for the second halftoning operation.

The method carried out by the embodiments described above can result in a sort of specialty micro-texture marking on a printed item, where information (such as authentication information) is embedded within the print on the printed item. While the specific embodiments relate to authentication information, other information, that does not signify that the item is authentic or original, can be embedded in the printed item in other embodiments.

Figure 4:
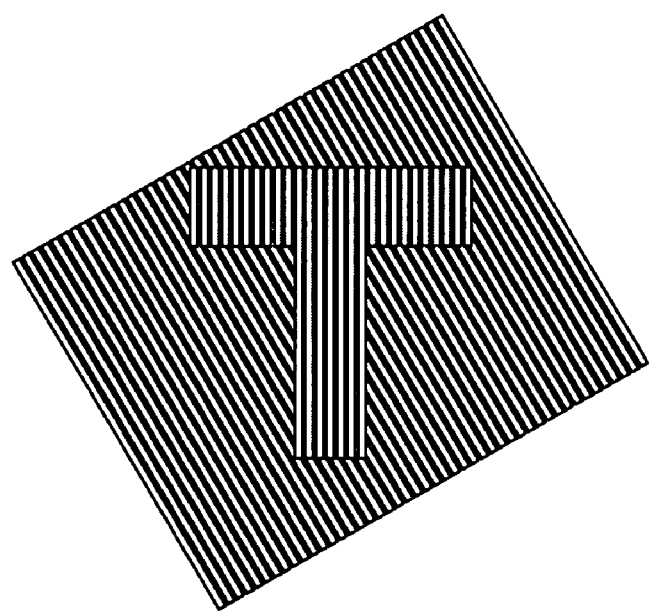
FIG. 4 is a diagram of a portion of an image with embedded authentication information.

The embedded information can be viewed by overlaying a "key" transparency (otherwise referred to herein as an overlay key) over the printed item to reveal the embedded information. An example overlay key will be described with reference to FIGS. 4 and 5. FIG. 4 shows an authentication image represented by the letter T, which is embedded within the print. A first embedded portion of the image corresponds to the authentication image pixel addresses (i.e., those forming the letter T), and comprises a pattern of vertical lines arranged in a first spatial frequency. A second embedded portion of the image corresponds to the background pixel addresses, and comprises a pattern of lines in a given angle approximately 15 degrees rotated counterclockwise in relation to the vertical lines of the first micro-texture portion. The background parallel lines are arranged in a second spatial frequency. In the illustrated embodiment, the first and second spatial frequencies are the same. In the illustrated example, the spatial frequencies are each 141 lines per inch.

Figure 5:
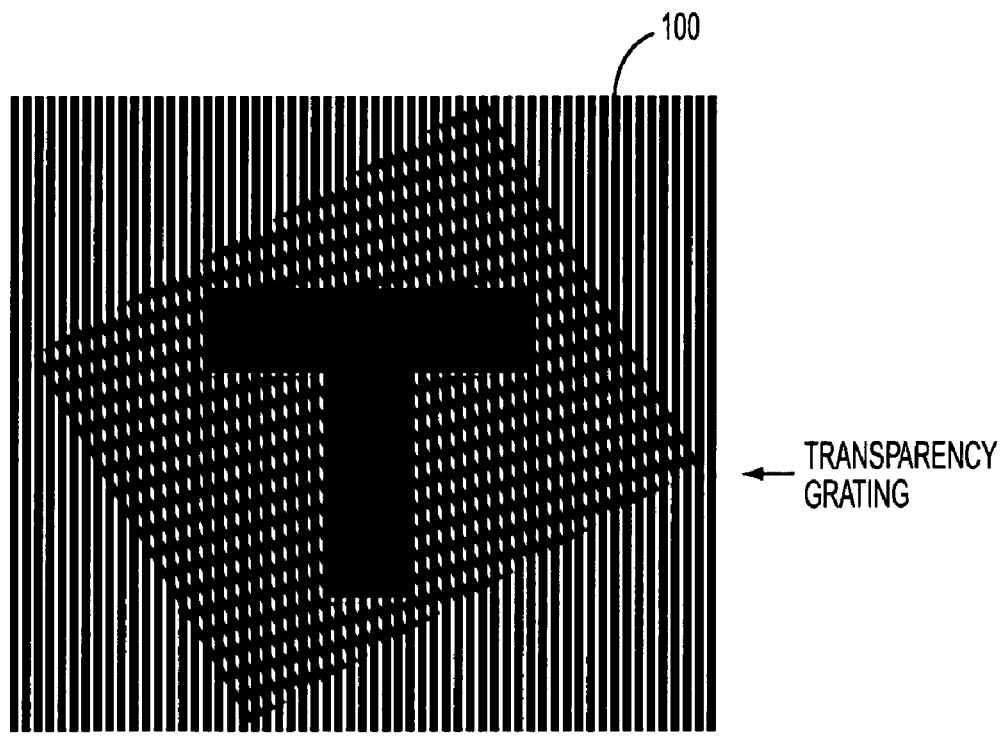
FIG. 5 is a diagram of an image with an overlay key.

FIG. 5 illustrates the same image with an overlay key 100. The illustrated key 100 has a line pattern at a spatial frequency equal to the halftone element frequency of one of the first and second halftoning operations and has a uniform medium tint grating. By rotating the key 100, an interference moire is produced which is stronger throughout one of the two embedded portions in the image, and which makes the embedded information visually apparent. The high frequency embedded information does not resolve on many copiers or photographs, so that the embedded information cannot be copied.

In the embodiments illustrated, the printed item 30 may include an item formed with, for example, a non-glossy print, such as ink jet, MICR (Magnetic Ink Character Recognition), and offset. In the illustrated embodiments, the screen frequencies of the background screen 24 and authentication image screen 26, in order to not to be visible to the naked eye, or are at or above approximately one hundred halftoning elements per inch or cpi, which stands for "clusters per inch".

The size of the overlay key may simply be any size, although it preferably exceeds the size of the authentication message within the image on the printed item. Alternatively, if the printed item is a page, the overlay key may be the full size of the page. In the embodiment illustrated, for example, as shown in FIG. 4, the overlay key has a line pattern at a frequency equal to the halftone frequency used both for forming the authentication message and the background. The authentication message and the background halftoning operations may be implemented with a common six hundred cpi xerographic printer.

When placing the overlay key over the image, it is helpful to move the key relative to the print in order to achieve the maximum effect and render the authentication message most visible. The illustrated methods described herein may be performed on a monochromatic image, or on a full color image. It is possible to embed a different authentication image or message for each separation. Accordingly, one may utilize a different overlay key for each separation, or a single overlay key could be rotated to view the authentication information for each separation.

In another embodiment, one could achieve similar effects by using different halftone frequencies such that both frequencies are above one hundred lpi (lines per inch) or halftoning elements per inch. Each screen would interfere differently with the transparency grating, and thus make one portion of the image visible in relation to the other.

Each element described hereinabove may be implemented with a hardware processor together with computer memory executing software or with specialized hardware for carrying out the same functionality. Any data handled in such processing or created as a result of such processing can be stored in any type of memory available to the artisan and appropriate for such data. For the disclosure herein, a machine readable media comprises any form of data storage mechanism, including the above-noted different memory technologies, as well as hardware or circuit representations of such structures and of such data.

The claims as originally presented and as they may be amended, encompass variations, alternatives, modifications, improvements, equivalents and substantial equivalents of the embodiments and teachings disclosed herein, including those that are presently unforeseen or unappreciated, and that, for example, may arise from applicants/patentees and others.

What is claimed is:

1. Apparatus comprising:
   a digital two-dimensional authentic image;
   an image processor;
   authentication message data representing an authentication message;
   a screen to be applied to at least a portion of the two-dimensional image, the screen applying two different halftoning operations including a first halftoning operation applying halftoning elements arranged in one way, and including a second halftoning operation applying halftoning elements in a second way, the first halftoning operation being applied in a limited area of the authentic image and in a form defined by the authentication message data, and the second halftoning operation being applied in an area surrounding the limited area; and
   a viewing key to render viewable the authentication message;
   wherein the halftoning elements of the first halftoning operation include parallel lines arranged at a first angle in relation to a horizontal line in the authentic image and wherein the halftoning elements of the second halftoning operation include parallel lines at a second angle in relation to the horizontal line, the second angle being different from the first angle.

2. The apparatus according to claim 1, wherein the viewing key includes a transparency overlay key.

3. The apparatus according to claim 2, wherein the transparency overlay key includes a uniform medium tint grating including a pattern of elements arranged in one of the one way and the second way.

4. The apparatus according to claim 2, wherein the authentication message signifies that the two-dimensional authentic image is authentic or original.

5. The apparatus according to claim 1, wherein the authentication message includes one of a textual message, a symbol, and a pattern.

6. The apparatus according to claim 1, wherein the halftoning elements include lines.

7. The apparatus according to claim 1, wherein the halftoning elements include dots.

8. The apparatus according to claim 1, wherein the second angle is different from the first angle by at least 15 degrees.

9. The apparatus according to claim 1, wherein the first angle is 45 degrees in relation to the horizontal line and wherein the second angle is 60 degrees in relation to the horizontal line.

10. The apparatus according to claim 1, wherein the area surrounding the limited area includes the entire remaining area of the authentic image.

11. Apparatus comprising:
a digital two-dimensional authentic image;
an image processor;
authentication message data representing an authentication message;
a screen to be applied to at least a portion of the two-dimensional image, the screen applying two different halftoning operations including a first halftoning operation applying halftoning elements arranged in one way, and including a second halftoning operation applying halftoning elements in a second way, the first halftoning operation being applied in a limited area of the authentic image and in a form defined by the authentication message data, and the second halftoning operation being applied in an area surrounding the limited area;
wherein the halftoning elements include geometric shapes and an absence thereof, alternating in a first spatial frequency for the halftoning elements of the first halftoning operation, and alternating in a second spatial frequency different from the first spatial frequency for the halftoning elements of the second halftoning operation.

12. A method comprising:
providing a digital two-dimensional authentic image;
processing the image;
providing authentication message data representing an authentication message;
applying a screen to at least a portion of the two-dimensional authentic image, the screen applying two different halftoning operations, including a first halftoning operation applying halftoning elements arranged in a first way, and including a second halftoning operation applying halftoning elements arranged in a second way, the first halftoning operation being applied in a limited area of the authentic image and in a form defined by the authentication message data, and the second halftoning operation being applied in an area surrounding the limited area; and
overlaying the image with a transparency overlay key to render viewable the authentication message;
wherein the halftoning elements include a geometric shape and an absence thereof, alternating in a first spatial frequency for the halftoning element of the first halftoning operation, and alternating in a second spatial frequency different from the first spatial frequency for the halftoning elements of the second halftoning operation.

13. The method according to claim 12, wherein the authentication message includes a textual message, a symbol, or a pattern.

14. The apparatus according to claim 12, wherein the authentication message signifies that the authentic image is authentic or original.

15. The method according to claim 12, wherein the geometric shape is a dot.

16. A method comprising:
providing a digital two-dimensional authentic image;
processing the image;
providing authentication message data representing an authentication message;
applying a screen to at least a portion of the two-dimensional authentic image, the screen applying two different halftoning operations, including a first halftoning operation applying halftoning elements arranged in a first way, and including a second halftoning operation applying halftoning elements arranged in a second way, the first halftoning operation being applied in a limited area of the authentic image and in a form defined by the authentication message data, and the second halftoning operation being applied in an area surrounding the limited area; and
overlaying the image with a transparency overlay key to render viewable the authentication message;
wherein the halftoning elements of the first halftoning operation include parallel lines arranged in a first angle in relation to a horizontal line in the authentic image, and wherein the halftoning elements of the second halftoning operation include parallel lines arranged in a second angle in relation to the horizontal line, the second angle being different from the first angle.

17. Computer-readable media encoded with data, the encoded data when read by a machine causing:
accessing a digital two-dimensional authentic image;
processing the authentic image;
accessing authentication message data representing an authentication message; and
applying a screen to at least a portion of the authentic message, the screen applying two different halftoning operations, including a first halftoning operation applying halftoning elements arranged in a first way, and including a second halftoning operation applying halftoning elements arranged in a second way, the first halftoning operation being applied in a limited area of the authentic image and in a form defined by the authentication message data, and the second halftoning operation being applied in an area surrounding the limited area; and
overlaying the image with a transparency overlay key to render viewable the authentication message;
wherein the halftoning elements of the first halftoning operation include parallel lines arranged in a first angle in relation to a horizontal line in the authentic image, and wherein the halftoning elements of the second halftoning operation include parallel lines arranged in a second angle in relation to the horizontal line, the second angle being different from the first angle.

* * * * *